(12) United States Patent
Giombanco et al.

(10) Patent No.: US 8,442,100 B2
(45) Date of Patent: May 14, 2013

(54) TRANSMISSION AND RECEPTION APPARATUS FOR DIGITAL SIGNALS

(75) Inventors: Salvatore Giombanco, Cassaro (IT); Giovanni Lombardo, Alcamo (IT); Salvatore Tumminaro, Marianopoli (IT); Filippo Marino, Tremestieri (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 368 days.

(21) Appl. No.: 12/826,424

(22) Filed: Jun. 29, 2010

(65) Prior Publication Data

US 2010/0329364 A1    Dec. 30, 2010

(30) Foreign Application Priority Data

Jun. 30, 2009   (IT) .............................. MI2009A1148

(51) Int. Cl.
*H04B 1/38* (2006.01)
(52) U.S. Cl.
USPC ....................................................... 375/220
(58) Field of Classification Search ................. 375/219, 375/220, 222, 259, 376
See application file for complete search history.

(56) References Cited

U.S. PATENT DOCUMENTS

| 5,448,571 | A | | 9/1995 | Hong et al. |
| 5,604,917 | A | * | 2/1997 | Saito et al. ...................... 710/49 |
| 5,764,917 | A | * | 6/1998 | Royer et al. ................... 709/231 |
| 7,668,975 | B2 | * | 2/2010 | McKim et al. .................... 710/8 |
| 2002/0075981 | A1 | | 6/2002 | Tang et al. |
| 2006/0234405 | A1 | | 10/2006 | Best |
| 2008/0311862 | A1 | | 12/2008 | Spina et al. |

OTHER PUBLICATIONS

European Search Report dated Sep. 30, 2010, for corresponding Application No. EP 10 16 7420, 7 pages.

* cited by examiner

*Primary Examiner* — Don N Vo
(74) *Attorney, Agent, or Firm* — Seed IP Law Group PLLC

(57) ABSTRACT

A transmission and reception apparatus includes a transmitter, a receiver and a galvanically isolated interface arranged between the transmitter and the receiver. The transmitter, receiver and interface are arranged so as to form a two-level isolated digital channel and the transmitter includes a block adapted to send a clock signal to the receiver. The receiver includes a circuit adapted to synchronize the receiver and the transmitter using the received clock signal and a circuit adapted to memorize information related to the synchronization in a storage element to hold the synchronization while the receiver is receiving the digital data. The transmitter block is adapted to send the digital data signal after the synchronization of the receiver and transmitter.

26 Claims, 7 Drawing Sheets

TRANSMISSION AND RECEPTION APPARATUS FOR DIGITAL SIGNALS

BACKGROUND

1. Technical Field

The present disclosure relates to a transmission and reception apparatus for digital signals and method thereof.

2. Description of the Related Art

It is known in prior art the use of galvanically isolated interfaces between a transmitter and a receiver, in which the signals are wirelessly transmitted. The digital signal transmission must be of the high bitrate type for transmitting data between one chip and another, while ensuring galvanic isolation. Typical bitrate values are 50-100 Mbit/s, while the isolation is in the range of 2-5 kV.

Various apparatuses for providing the galvanic isolation currently exist.

One of these consists in using an integrated transformer. The latter is made by means of a pile structure in which the secondary winding generally consists of the metal layer arranged at the bottom level, the primary winding of the metal layer arranged at the upper level and the isolation between the two windings consists of various dielectric layers arranged between the two metal layers, the thickness of which depends on the desired level of isolation. Alternatively, the secondary winding may be made of the metal layer arranged on the upper level, the dielectric layer is inserted thereon and finally the primary winding is made of an additional metal layer. The isolation transformer is formed on the receiver die. The driver die contains the transmitter which, through the bonding, is connected to the primary of the isolation transformer. The secondary of the transformer is connected to the receiver which processes the transmitted signal. The data flow may also occur from the secondary to the primary, if a two-way channel is desired. The signals must be appropriately processed by means of a modulation technique in order to transfer information through the isolated interface. This type of component allows to obtain a high bitrate, good reliability and isolation capacity. However, this configuration has the addition of processing steps for obtaining the transformer (e.g., for increasing the thickness of the isolating layer in order to achieve the required degree of isolation), as well as the use of bonding wires for connecting the transmitter of the driver die to the transformer itself.

Another galvanic isolation apparatus, described in US Patent Publication No. 2008/0311862, comprises a system based on a transmission of wireless type. The two chips are reciprocally assembled and the isolation is obtained by means of an interposed insulating layer. The electromagnetic coupling is made by means of a pair of coils, in particular by means of the magnetic field produced by the current which flows over the transmission coil. The thickness of the upper chip (e.g., the transmitter chip) is reduced by lapping in order to maximize the coupling between the two coils. The signals are appropriately processed by means of a modulation technique in order to transfer information through the isolated interface. This configuration has the advantage of requiring neither additional processing steps nor bonding wires between the two chips. However, it has the disadvantage of a low coupling coefficient and high variability thereof which depends on the thickness tolerance after lapping the die, the thickness tolerance of the insulating layer and the alignment tolerance between the two chips.

A further galvanic isolation apparatus, again described in US Patent Publication No. 2008/0311862, comprises a system based on a transmission of wireless type. In this case, the two chips are assembled side-by-side and the isolation is obtained by means of an insulating layer placed below the two chips. The electromagnetic coupling is made by means of a pair of coils, in particular by means of the magnetic field produced by the current which flows over the transmission coil. The signals are appropriately processed by means of a modulation technique in order to transfer information through the isolated interface. This configuration also has the advantage of requiring neither additional processing steps nor bonding wires between the two chips. However, it has the advantage of a highly variable, lower coupling coefficient as compared to the previous structure, according to the alignment tolerance between the two chips and the distance tolerance between the two chips.

Regardless of the structure used for making the coupled inductors, today there exist two main approaches for transmitting a signal through the channel.

A first technique is of the narrowband type, in which the signal is transmitted on a carrier. Thereby, a high signal/noise ratio, or SNR, may be obtained to the detriment of a high circuit complexity due to the use of radio frequency circuits, such as an oscillator, a low-noise amplifier, a mixer, a filter, etc.

A second technique is of the wideband type, in which wideband pulses (UWB Pulses) are transmitted. Thereby, the circuit complexity of the transceiver is reduced, but the signal/noise ratio is worse.

A transmission technique which may be implemented with a relatively simple system is the on-off keying (OOK) technique, in which information is encoded in the form of transmitted signal absence-presence. FIG. 1 shows a block diagram of the system with a transmitter 100 on the die 101, a receiver 200 on the die 201, a galvanic isolator 300, an input signal Sin to the transmitter 100 and an output signal Sout from the receiver.

If a narrowband approach is used, the input signal to the isolator 300 enables an oscillator which generates the OOK W carrier. The signal is amplified and processed in the receiver in order to extract the envelope.

If a wideband approach is used, a pulse TP is generated at each (positive and negative) wave-front of the input signal to the isolator 300.

The signal is amplified and processed in the receiver to extract the polarity thereof. Thereby, for example, a positive wave-front is decoded if the received pulse has positive polarity, otherwise a negative wave-front is decoded. FIGS. 2 and 3 show the main waveforms of the signals in a system of this type, with narrowband and wideband techniques, respectively.

Such a system, i.e., a system based on the recognition of the signal presence-absence, which allows to obtain an isolated channel through which the transmission of a digital signal characterized by two levels (high and low) is possible, is referred to as "two-level isolated digital channel". The previously mentioned applications use isolated digital channels in which the synchronization signal (clock) may be transmitted in addition to the data signal itself. The simplest, but more expensive solution is to employ two channels: one for transmitting the clock and one for transmitting the data. In actual fact, there are more advantageous solutions, which use appropriate modulation techniques to transmit the clock and data on a single channel: ASK modulation, FSK modulation, etc. ASK modulation allows the simultaneous transmission of the clock and data in a relatively simple system, by implementing the narrowband approach. FIG. 4 shows a block diagram of a system, which allows the transmission and reception of the clock and data on a single channel, e.g., based on ASK modulation.

The Clock signal, at interface input, enables an oscillator which generates an ASKW carrier, the amplitude of which is modulated by the Data signal. For example, if the transmitted data is "zero", the peak-to-peak amplitude of the carrier is equal to Vdd/2 (where Vdd is the supply voltage of the transmitter); if the transmitted data is "one", the peak-to-peak amplitude of the carrier is equal to Vdd.

The received signal is amplified and processed in order to extract the envelope. Such an envelope is compared, by means of a comparator, with two thresholds: a low threshold VthL and a high threshold VthH. If the amplitude of such a signal is comprised between the low threshold VthL and the high threshold VthH, the demodulated datum is "zero", while if the amplitude is higher than the high threshold VthH, the demodulated datum is "one". At the same time, the envelope must exceed one of the two thresholds to extract the clock. FIG. 5 shows the main waveforms of a system which uses the ASK modulation technique, i.e., the input clock signal ClockIN to the transmitter, the input data signal DataIN to the transmitter, the carrier ASKW, the envelope ASKENV, the output clock signal ClockOUT from the receiver, and the output data signal DataOUT from the receiver.

In order to ensure a good interference immunity, the amplifier gain and the threshold values VthL and VthH may be appropriately fixed. In particular, once the values of the thresholds VthL and VthH have been fixed, the gain is chosen so that the amplitude of the input signal to the comparator, when zero is received, is equal to (VthH+VthL)/2. The received signal amplitude depends on the transmitted signal amplitude and coupling coefficient of the coils. Therefore, in the case of the pile or planar structure, the amplitude of the received signal is highly variable because, as previously mentioned, the coupling coefficient depends on the assembly quality. Therefore, the circuitry of the receiver is complicated, e.g., by inserting a variable gain amplifier (VGA) and a gain control loop to compensate for such a variability. Furthermore, before transmitting the data itself, the carrier with a known amplitude is transmitted for a time interval so that the system may appropriately adjust the VGA gain. Unfortunately, such an increase of circuit complexity of the receiver thwarts the use of the ASK modulation technique, which is indeed chosen for its simplicity.

BRIEF SUMMARY

Given the prior art, it is the object of the present disclosure to provide embodiments of a transmission and reception apparatus for digital signals which is less complex than those known and which is not generally affected by the high variability of the coupling coefficient of the pair of coils of the galvanically isolated interface.

In accordance with an embodiment, such an object is achieved by means of a transmission and reception apparatus for at least one digital data signal, said digital data signal being characterized by two logical levels, first and second logical levels, with said second logical level higher than the first logical level, said apparatus comprising a transmitter, a receiver and a galvanically isolated interface, such as a galvanic isolator, arranged between the transmitter and the receiver, said transmitter, receiver and interface being arranged so as to form a two-level isolated digital channel, said transmitter comprising means adapted to send a clock signal to the receiver, characterized in that said receiver comprises circuit means adapted to synchronize the receiver with the transmitter by means of the received clock signal, said transmitter comprising further means adapted to send said digital data signal after the synchronization of the receiver and transmitter, said receiver comprising further means adapted to memorize information related to the synchronization in a storage element in order to hold the synchronization while said receiver is receiving said digital data.

In an embodiment, a receiver is able to synchronize itself with a transmitter and to memorize information related to the synchronization in a storage element. This facilitates transmitting a bit sequence of a determined length through a single galvanic isolator, which may comprise, for example, a pair of coupled inductors which may be in the form of a coil. In an embodiment, the determined length may be a fixed length. In a first phase, for a determined time period Tsync, the transmitter sends a synchronization signal and the receiver synchronizes itself with the transmitter based on the synchronization signal. Information pertaining to the synchronization is memorized at the end of the first phase. In a second phase, for a determined time period Tseq, the receiver receives bit sequence from the transmitter and uses the memorized information pertaining to the synchronization to remain synchronized with the transmitter. In an embodiment, one or more of the determined time periods may be fixed time periods.

In an embodiment, an apparatus comprises: a transmitter and configured to transmit, digital signals having a first logic level and a second logic level higher than the first logic level; a transmitter control block and coupled to the transmitter and configured to selectively provide synchronization signals or digital data signals to the transmitter for transmission; a receiver and configured to receive signals transmitted by the transmitter; a receiver control block and coupled to the receiver and including a phase-frequency detector, a voltage-controlled oscillator and a sampler coupled between the phase-frequency detector and the voltage-controlled oscillator, the receiver control block configured to synchronize the receiver with the transmitter using synchronization signals received by the receiver from the transmitter, to memorize and store synchronization information sampled by the sampler and to hold synchronization while the transmitter is transmitting data signals; and a galvanically isolated interface and coupled between the transmitter and the receiver, said transmitter and interface being configured to form a two-level isolated digital channel, wherein the transmitter control block is configured to provide a synchronization signal to the transmitter to transmit to the receiver during a synchronization period and to provide a digital data signal, the digital data signal being representative of a bit sequence, to the transmitter to transmit during a data sequence transmission period after synchronization of the transmitter and receiver. In an embodiment, said transmitter control block and said receiver control block each comprise a timer configured to determine a transition between the synchronization signal and the digital data signal. In an embodiment, said transmitter control block comprises a selector configured to receive the synchronization signal and the digital data signal and to send the synchronization signal or digital data signal to said transmitter to transmit to the receiver. In an embodiment, said phase-frequency detector is configured to generate a voltage proportional to a phase-frequency difference between the synchronization signal and a signal deriving from the voltage-controlled oscillator, said sampler configured to interrupt a feedback loop, to sample an output voltage of the phase-frequency detector and to keep the sampled output voltage of the phase-frequency detector at the input of the voltage-controlled oscillator so that the voltage-controlled oscillator provides a signal synchronous with the synchronization signal.

In an embodiment, said sampler comprises a sample and hold block comprising a switch and a capacitor having a terminal in common, said capacitor being coupled to the input of the voltage-controlled oscillator and to the output of the phase-frequency detector, the switch being controlled by a hold signal configured to keep the switch closed when synchronizing the receiver and the transmitter using the received synchronization signal and configured to open the switch after the synchronization, so that said capacitor keeps the output signal from the phase-frequency detector before opening the switch and said voltage-controlled oscillator, driven by the voltage at the terminals of said capacitor, supplies a signal which is in phase with the synchronization signal received when sending said digital data signal. In an embodiment, the phase-frequency detector comprises first and second flip-flops having at an input signals output from respective first and second AND gates, the first AND gate having an input synchronization signal and an input reverse of a hold signal, the second AND gate having an input feedback signal and the input reverse of the hold signal, said flip-flops configured to increase or decrease a frequency of the voltage-controlled oscillator to make it equal to that of the input synchronization signal, said phase-frequency detector not supplying any output signal when said hold signal is at a high logical level. In an embodiment, said galvanically isolated interface comprises a transmitting coupled inductor and a receiving coupled inductor comprising a pair of coils. In an embodiment, said transmitter and said transmitting coupled inductor are integrated in a first die, and said receiver and said receiving coupled inductor are integrated in a second die, said first and second dice being encapsulated in a package. In an embodiment, the transmitter control block is integrated in the first die and the receiver control block is integrated in the second die. In an embodiment, the sampler comprises an analog-to-digital converter configured to convert a sampled analog signal to a digital control signal and a digital-to-analog converter configured to convert the digital control signal to an analog control signal.

In an embodiment, a system comprises: a transmitter configured to: in a first mode of operation of the transmitter, transmit a synchronization signal during a synchronization time period; and in a second mode of operation of the transmitter, transmit, during a data transmission time period, a digital data signal having a first logic level and a second logic level higher than the first logic level, the digital data signal representative of a bit sequence; a receiver configured to: in a first mode of operation of the receiver, synchronize the receiver to the synchronization signal transmitted by the transmitter, the receiver including a synchronization feedback loop with a sample and hold module configured to sample and hold a value of a synchronization control signal when the receiver and transmitter are synchronized; and in a second mode of operation of the receiver, receive the transmitted digital data signal, wherein the sample and hold module is configured to interrupt the feedback loop and maintain the sampled value of the synchronization control signal at an input of the feedback loop to maintain synchronization with the transmitter; and a galvanically isolated interface positioned between the transmitter and the receiver, the transmitter and the galvanically isolated interface configured to form a two-layer isolated digital channel. In an embodiment, the transmitter and the receiver each comprise a timer configured to determine the end of the first mode of operation and the beginning of the second mode of operation. In an embodiment, the transmitter comprises a selector configured to receive the synchronization signal and the digital data signal and to select one of the synchronization signal and the digital data signal to transmit to the receiver. In an embodiment, the receiver comprises: a phase-frequency detector; and a voltage-controlled oscillator, where the sample and hold module is coupled between the phase-frequency detector and the voltage-controlled oscillator, said phase-frequency detector generating a voltage proportional to a phase-frequency difference between a received synchronization signal and a signal deriving from the voltage-controlled oscillator, said sample and hold module configured to interrupt a feedback loop between the phase-frequency detector and the voltage controlled oscillator, to sample an output voltage of the phase-frequency detector and to keep a sampled value of said output voltage of the phase-frequency detector at an input of the voltage-controlled oscillator so that the voltage controlled oscillator provides a signal synchronous with the received synchronization signal. In an embodiment, the sample and hold module comprises a switch and a capacitor having a terminal in common, said capacitor being coupled to the input of the voltage-controlled oscillator and to the output of the phase-frequency detector, the switch being controlled by a hold signal adapted to keep the switch closed when synchronizing the receiver and the transmitter using the received synchronization signal and adapted to open the switch after synchronization, so that said capacitor keeps the output signal from the phase-frequency detector before opening the switch and said voltage-controlled oscillator, driven by the voltage at the terminals of said capacitor, supplies a signal which is in phase with the synchronization signal when receiving said digital data signal. In an embodiment, the phase-frequency detector comprises first and second flip-flops having at an input a signal output from respective first and second AND gates, the first AND gate having an input clock signal and an input reverse of a hold signal, the second AND gate having an input feedback signal and the input reverse of the hold signal, said flip-flops configured to increase or decrease a frequency of the voltage-controlled oscillator to make it equal to that of the input synchronization signal, said phase-frequency detector not supplying any output signal when said hold signal is at a high logical level. In an embodiment, the transmitter and a transmitting coupled inductor are integrated in a first die, and the receiver and a receiving coupled inductor are integrated in a second die, said first and second dice being encapsulated in a single package.

In an embodiment, a device comprises: means for transmitting a synchronization signal in a first mode of operation of the means for transmitting, the first mode corresponding to a synchronization time period, and, in a second mode of operation of the means for transmitting, a digital data signal having a first logic level and a second logic level higher than the first logic level, the second mode of operation corresponding to a data transmission time period; means for receiving signals transmitted by the means for transmitting, comprising: means for synchronizing to the synchronization signal in a first mode of operation of the means for receiving; means for sampling a synchronization control value of a feedback loop in the first mode of operation of the means for receiving; and means for interrupting the feedback loop and processing a received digital data signal using the sampled synchronization control value in a second mode of operation of the means for receiving; and means for providing a two-layer isolated digital channel between the means for transmitting and the means for receiving. In an embodiment, the means for transmitting and the means for receiving each comprise a timer configured to determine the end of the first mode of operation and the begin of the second mode of operation. In an embodiment, the means for transmitting comprises a selector configured to receive the synchronization signal and the digital data signal and to select one of the synchronization signal and the digital data signal to transmit to the receiver. In an embodiment, the selector comprises a multiplexer. In an embodiment, the means for receiving comprises: a phase-frequency detector; a voltage-controlled oscillator; and a sample and hold module coupled between the phase-frequency detector and the voltage-controlled oscillator, said phase-frequency detector generating a voltage proportional to a phase-frequency difference between a received synchronization signal and a signal deriving from the voltage-controlled oscillator, said sample and hold module configured to interrupt the feedback loop, to sample an output voltage of the phase-frequency detector and to keep a value of said sampled voltage of the phase-frequency detector at an input of the voltage-controlled oscillator so that the voltage controlled oscillator provides a signal synchronous with the received synchronization signal.

In an embodiment, a method comprises: transmitting, during a synchronization period, a synchronization signal from a transmitter to a receiver, wherein a galvanically isolated interface is positioned between the transmitter and the receiver, and the transmitter and the interface are configured to form a two-layer isolated digital channel; synchronizing the receiver to the synchronization signal; sampling a synchronization control signal of a synchronization feedback loop when the receiver is synchronized; interrupting the feedback loop; transmitting, during a data transmission time period, a digital data signal having a first logic level and a second logic level higher than the first logic level from the transmitter to the receiver, the digital data signal representative of a sequence of bits; and maintaining synchronization when receiving the transmitted digital data signal based on the sampled synchronization control signal. In an embodiment, the method further comprises delaying a start of the data transmission time period for a delay time period after an end of the synchronization time period. In an embodiment, sampling the synchronization control signal comprises sampling and holding an output from a phase frequency detector when the receiver is synchronized with the synchronization signal. In an embodiment, sampling the synchronization control signal comprises sampling an output from a phase frequency detector when the receiver is synchronized with the synchronization signal, converting the sampled output to a digital control signal and storing the digital control signal.

In an embodiment, an apparatus comprises: a transmitter embedded in a package and configured to transmit digital signals having a first logic level and a second logic level higher than the first logic level; a transmitter control block embedded in the package and coupled to the transmitter and configured to selectively provide synchronization signals or digital data signals to the transmitter for transmission; a receiver embedded in the package and configured to receive signals transmitted by the transmitter; a receiver control block embedded in the package and coupled to the receiver, the receiver control block configured to synchronize the receiver with the transmitter using synchronization signals received by the receiver from the transmitter, to memorize synchronization in a storage element and to hold synchronization while the transmitter is transmitting data signals; and a galvanically isolated interface embedded in the package and coupled between the transmitter and the receiver, said transmitter and interface being configured to form a two-level isolated digital channel, wherein the transmitter control block is configured to provide a synchronization signal to the transmitter to transmit to the receiver during a determined synchronization period and to provide a digital data signal, the digital data signal being representative of a bit sequence of a determined length, to the transmitter to transmit during a determined data sequence transmission period after synchronization of the transmitter and receiver. In an embodiment, said transmitter control block and said receiver control block each comprise a timer configured to determine a transition between the synchronization signal and the digital data signal. In an embodiment, said transmitter control block comprises a selector configured to receive the synchronization signal and the digital data signal and to send the synchronization signal or digital data signal to said transmitter to transmit to the receiver. In an embodiment, said receiver control block comprises a synchronizer comprising a phase-frequency detector, a voltage-controlled oscillator and a sampler, acting as storage element, coupled between the phase-frequency detector and the voltage-controlled oscillator, said phase-frequency detector generating a voltage proportional to a phase-frequency difference between the synchronization signal and a signal deriving from the voltage-controlled oscillator, said sampler configured to interrupt a feedback loop, to sample an output voltage of the phase-frequency detector and to keep the sampled output voltage of the phase-frequency detector at the input of the voltage-controlled oscillator so that the voltage-controlled oscillator provides a signal synchronous with the synchronization signal. In an embodiment, said sampler comprises a sample and hold block comprising a switch and a capacitor having a terminal in common, said capacitor being coupled to the input of the voltage-controlled oscillator and to the output of the phase-frequency detector, the switch being controlled by a hold signal configured to keep the switch closed when synchronizing the receiver and the transmitter using the received synchronization signal and configured to open the switch after the synchronization, so that said capacitor keeps the output signal from the phase-frequency detector before opening the switch and said voltage-controlled oscillator, driven by the voltage at the terminals of said capacitor, supplies a signal which is in phase with the synchronization signal received when sending said digital data signal. In an embodiment, the phase-frequency detector comprises first and second flip-flops having at an input signals output from respective first and second AND gates, the first AND gate having an input synchronization signal and an input reverse of a hold signal, the second AND gate having an input feedback signal and the input reverse of the hold signal, said flip-flops configured to increase or decrease a frequency of the voltage-controlled oscillator to make it equal to that of the input synchronization signal, said phase-frequency detector not supplying any output signal when said hold signal is at a high logical level. In an embodiment, said galvanically isolated interface comprises a transmitting coupled inductor and a receiving coupled inductor comprising a pair of coils. In an embodiment, said transmitter and said transmitting coupled inductor are integrated in a first die, and said receiver and said receiving coupled inductor are integrated in a second die, said first and second dice being encapsulated in the package. In an embodiment, the transmitter control block is integrated in the first die and the receiver control block is integrated in the second die. In an embodiment, the sampler comprises an analog-to-digital converter configured to convert a sampled analog signal to a digital control signal and a digital-to-analog converter configured to convert the digital control signal to an analog control signal.

In an embodiment, a system, comprises: a transmitter configured to: in a first mode of operation of the transmitter, transmit a synchronization signal during a determined synchronization time period; and in a second mode of operation of the transmitter, transmit, during a determined data transmission time period, a digital data signal having a first logic level and a second logic level higher than the first logic level, the digital data signal representative of a bit sequence of a determined length; a receiver configured to: in a first mode of operation of the receiver, synchronize the receiver to the synchronization signal transmitted by the transmitter and memorize a synchronization control value; and in a second mode of operation of the receiver, receive the transmitted digital data signal using the memorized synchronization control value to maintain synchronization with the transmitter; and a galvanically isolated interface positioned between the transmitter and the receiver, the transmitter and the galvanically isolated interface configured to form a two-layer isolated digital channel. In an embodiment, the transmitter and the receiver each comprise a timer configured to determine an end of the first mode of operation and a beginning of the second mode of operation. In an embodiment, the transmitter comprises a selector configured to receive the synchronization signal and the digital data signal and to select one of the synchronization signal and the digital data signal to transmit to the receiver. In an embodiment, the receiver includes a synchronizer comprising: a phase-frequency detector; a voltage-controlled oscillator; and a sample and hold module coupled between the phase-frequency detector and the voltage-controlled oscillator, said phase-frequency detector generating a voltage proportional to a phase-frequency difference between a received synchronization signal and a signal deriving from the voltage-controlled oscillator, said sample and hold module configured to interrupt a feedback loop, to sample an output voltage of the phase-frequency detector and to keep a sampled value of said output voltage of the phase-frequency detector at an input of the voltage-controlled oscillator so that the voltage controlled oscillator provides a signal synchronous with the received synchronization signal, wherein the sampled value of the output voltage of the phase-frequency detector is the memorized synchronization control value. In an embodiment, the sample and hold module comprises a switch and a capacitor having a terminal in common, said capacitor being coupled to the input of the voltage-controlled oscillator and to the output of the phase-frequency detector, the switch being controlled by a hold signal adapted to keep the switch closed when synchronizing the receiver and the transmitter using the received synchronization signal and adapted to open the switch after synchronization, so that said capacitor keeps the output signal from the phase-frequency detector before opening the switch and said voltage-controlled oscillator, driven by the voltage at the terminals of said capacitor, supplies a signal which is in phase with the synchronization signal when receiving said digital data signal. In an embodiment, the phase-frequency detector comprises first and second flip-flops having at an input a signal output from respective first and second AND gates, the first AND gate having an input clock signal and an input reverse of a hold signal, the second AND gate having an input feedback signal and the input reverse of the hold signal, said flip-flops configured to increase or decrease a frequency of the voltage-controlled oscillator to make it equal to that of the input synchronization signal, said phase-frequency detector not supplying any output signal when said hold signal is at a high logical level. In an embodiment, the transmitter and a transmitting coupled inductor are integrated in a first die, and the receiver and a receiving coupled inductor are integrated in a second die, said first and second dice being encapsulated in a single package.

In an embodiment, a device comprises: means for transmitting a synchronization signal in a first mode of operation of the means for transmitting, the first mode corresponding to a determined synchronization time period, and, in a second mode of operation of the means for transmitting, a digital data signal having a first logic level and a second logic level higher than the first logic level, the second mode of operation corresponding to a determined data transmission time period; means for receiving signals transmitted by the means for transmitting, comprising: means for synchronizing to the synchronization signal in a first mode of operation of the means for receiving; means for memorizing a synchronization control value in the first mode of operation of the means for receiving; and means for processing a received digital data signal using the memorized synchronization control value in a second mode of operation of the means for receiving; and means for providing a two-layer isolated digital channel between the means for transmitting and the means for receiving. In an embodiment, the means for transmitting and the means for receiving each comprise a timer configured to determine an end of the first mode of operation and a beginning of the second mode of operation. In an embodiment, the means for transmitting comprises a selector configured to receive the synchronization signal and the digital data signal and to select one of the synchronization signal and the digital data signal to transmit to the receiver. In an embodiment, the selector comprises a multiplexer. In an embodiment, the means for receiving includes a synchronizer comprising: a phase-frequency detector; a voltage-controlled oscillator; and a sample and hold module coupled between the phase-frequency detector and the voltage-controlled oscillator, said phase-frequency detector generating a voltage proportional to a phase-frequency difference between a received synchronization signal and a signal deriving from the voltage-controlled oscillator, said sample and hold module configured to interrupt a feedback loop, to sample an output voltage of the phase-frequency detector and to keep a value of said sampled voltage of the phase-frequency detector at an input of the voltage-controlled oscillator so that the voltage controlled oscillator provides a signal synchronous with the received synchronization signal.

In an embodiment, a method comprises: transmitting, during a determined synchronization period, a synchronization signal from a transmitter to a receiver, wherein a galvanically isolated interface is positioned between the transmitter and the receiver, and the transmitter and the interface are configured to form a two-layer isolated digital channel; synchronizing the receiver to the synchronization signal; storing a synchronization control signal; transmitting, during a determined data transmission time period, a digital data signal having a first logic level and a second logic level higher than the first logic level from the transmitter to the receiver, the digital data signal representative of a sequence of bits of a determined length; and maintaining synchronization when receiving the transmitted digital data signal based on the stored synchronization control signal. In an embodiment, the method further comprises delaying a start of the data transmission time period for a determined delay time period after an end of the synchronization time period. In an embodiment, storing the synchronization control signal comprises sampling and holding an output from a phase frequency detector when the receiver is synchronized with the synchronization signal. In an embodiment, storing the synchronization control signal comprises sampling an output from a phase frequency detector when the receiver is synchronized with the synchronization signal, converting the sampled output to a digital control signal and storing the digital control signal.

BRIEF DESCRIPTION OF THE SEVERAL VIEWS OF THE DRAWINGS

The features and advantages of some embodiments of the present disclosure will be apparent from the following detailed description of a practical embodiment thereof, shown by way of non-limitative example in the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, receivers and transmitters, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
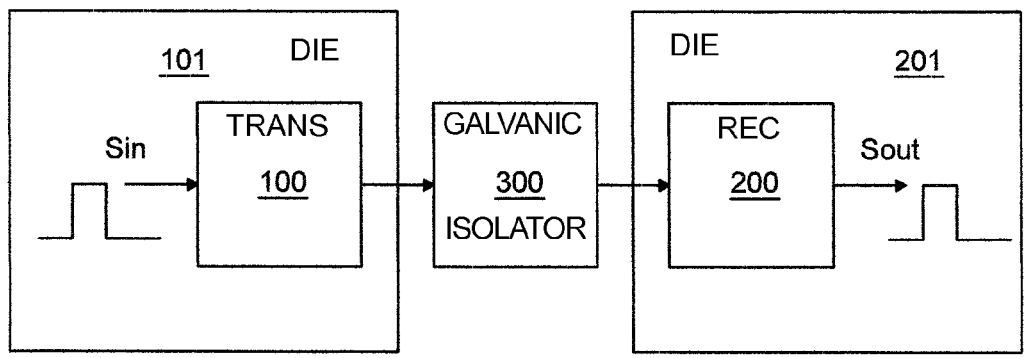
FIG. 1 is a diagrammatic view of a data transmission and reception system with a galvanic isolator.
Figure 2:
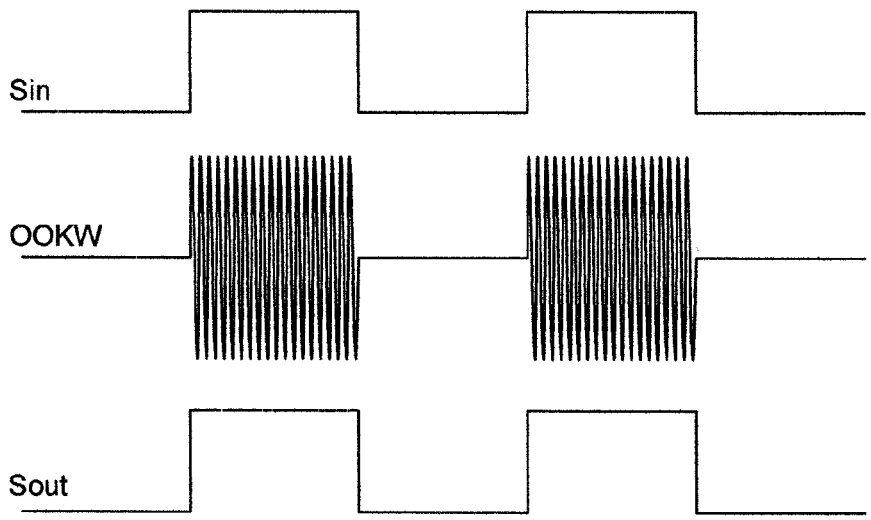
FIG. 2 shows the involved signals in the apparatus in FIG. 1 with narrowband modulation.
Figure 3:
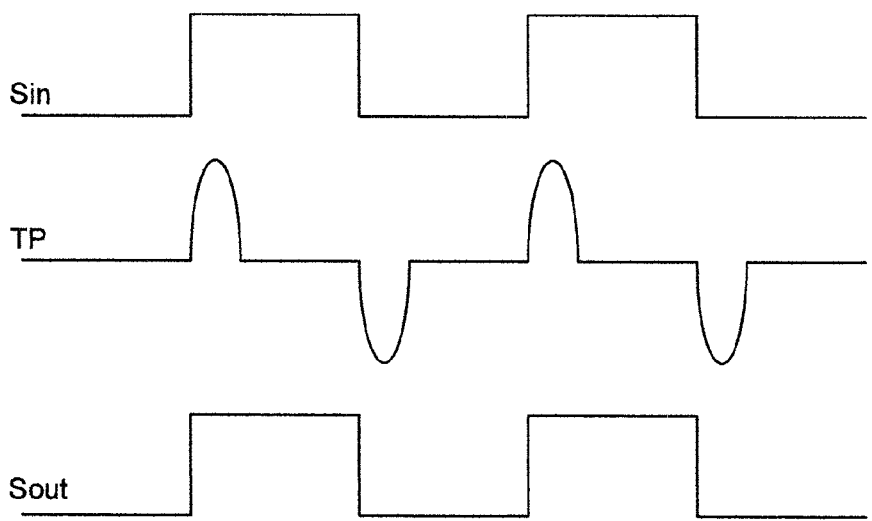
FIG. 3 shows the involved signals in the apparatus in FIG. 1 with broadband modulation.
Figure 4:
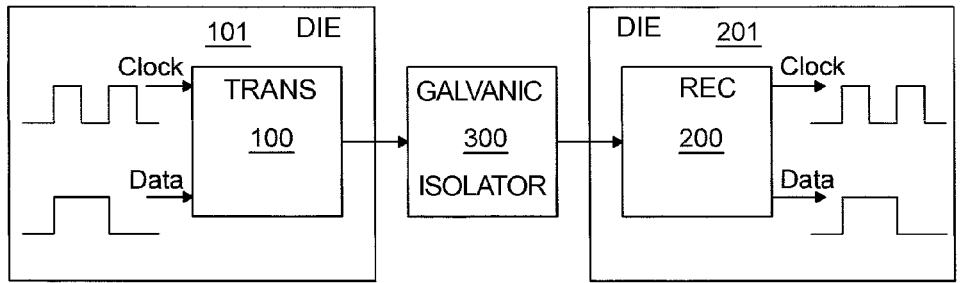
FIG. 4 is a diagrammatic view of the apparatus in FIG. 1 with signals transmitted and received according to ASK modulation.
Figure 5:
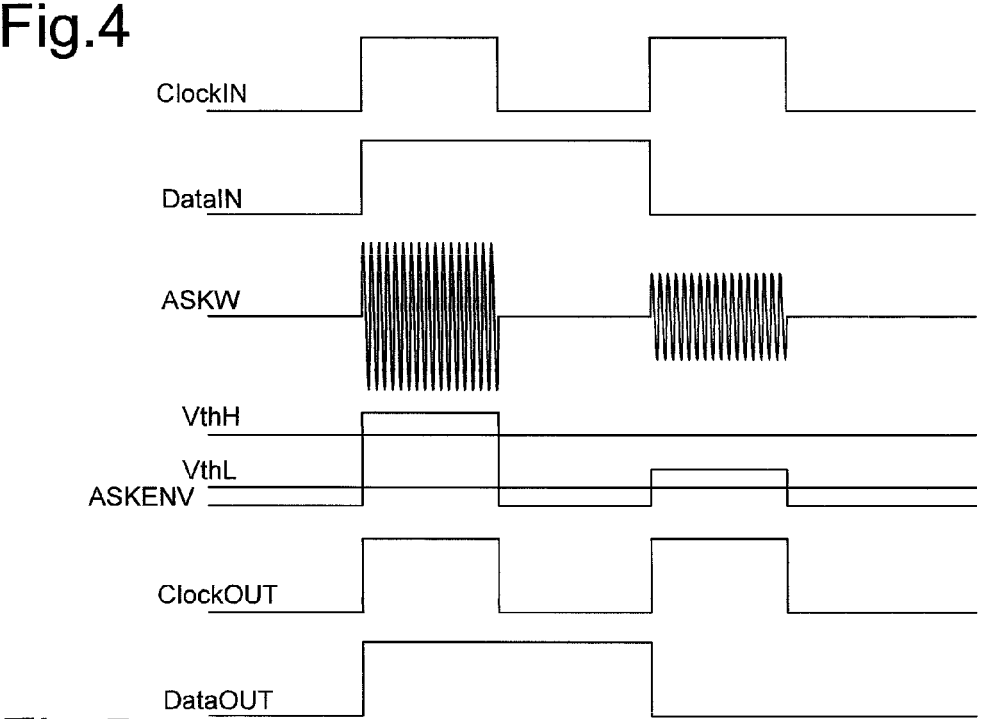
FIG. 5 shows the involved signals in the apparatus in FIG. 4 according to ASK modulation.
Figure 6:
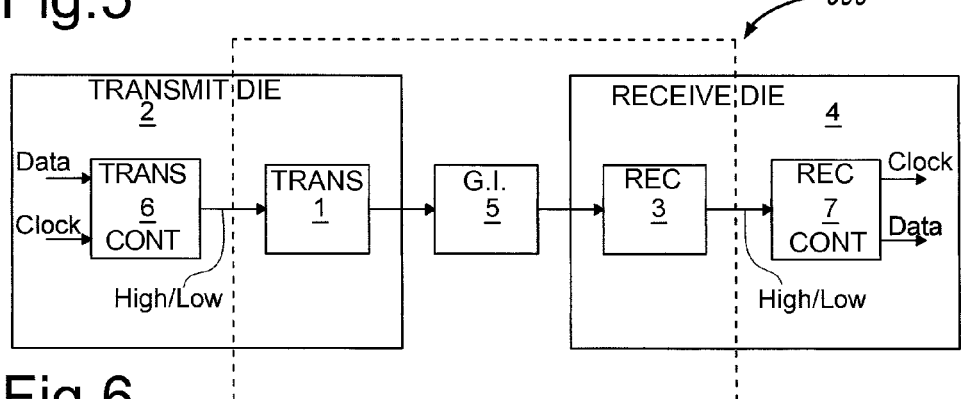
FIG. 6 shows a transmission and reception apparatus for digital signals in accordance with an embodiment.

FIG. 6 shows a transmission and reception apparatus for digital signals in accordance with an embodiment. The apparatus comprises a two-logical-level (high and low) digital signal transmission circuit comprising a transmitter block 1 and a transmitter control circuit block 6 having the CLOCK and DATA input signals and connected to the transmitter block 1; both transmitter block 1 and circuit block 6 are arranged on a transmitter die 2. The apparatus comprises a two-level (high and low) digital signal reception circuit comprising a receiver block 3 and a reception control block 7 having the CLOCK and DATA output signals and connected to the receiver block 3; both receiver block 3 and circuit reception control block 7 are arranged on a receiver die 4. Dice 2 and 4 may be assembled either side-by-side or one on top of the other. The apparatus further comprises a galvanic isolator 5 arranged between the transmitter block 1 and the receiver block 3, so as to form an two-level isolated digital channel therewith. The CLOCK and DATA signals are transmitted in consecutive time instants, i.e., after the time range Tsync, in which the CLOCK signal is sent, the DATA signal is sent. For example, in an embodiment the Tsync may be 2 microseconds. The CLOCK signal allows the synchronization of receiver 3 and transmitter 1, while the DATA signal comprises the information in digital format which must be transmitted by transmitter 1 to receiver 3. The galvanic isolator comprises a transmitting micro coupled inductor connected to the transmitter block 1 and a receiving micro-coupled inductor connected to the receiver block 3; the micro coupled inductors are made of a pair of coils. The transmitting circuit and the transmitting coupled inductor may be integrated in die 2, and the reception circuit and the receiving coupled inductor may be integrated in die 4, and dice 2 and 4 may be encapsulated in a single package 600.

Figure 7:
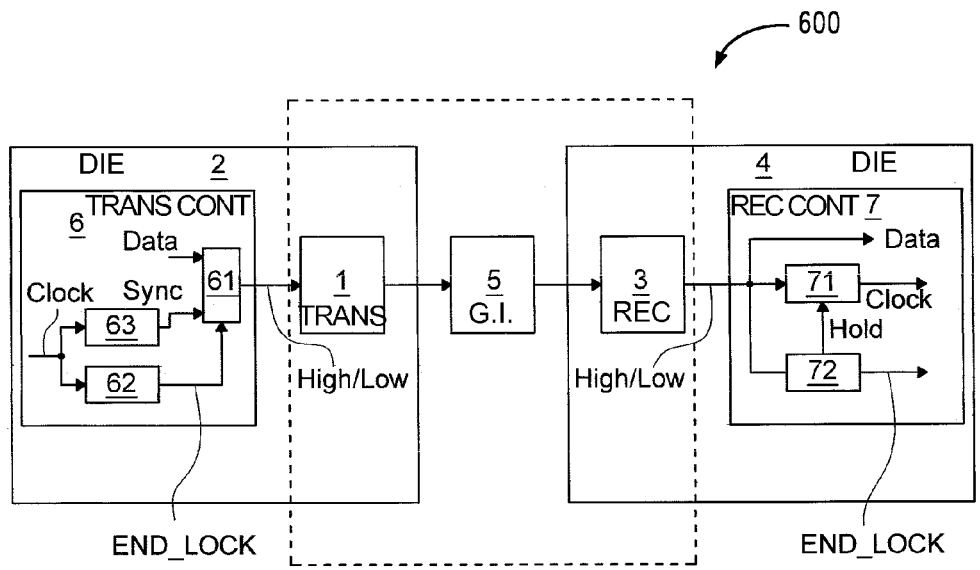
FIG. 7 shows an embodiment of the apparatus in FIG. 6 more in detail.

FIG. 7 shows an embodiment of the apparatus in FIG. 6 more in detail.

The transmission control circuit block 6 comprises a selector, such as, for example, a multiplexer 61 having the input DATA signal, a timer 62, which may be implemented, for example, with a counter, having the input CLOCK signal and the output END_LOCK signal, and async generator 63 having the input CLOCK signal and the output SYNC signal. The sync generator 63 may comprise, for example, a logic block configured to receive the input CLOCK signal and generate the output SYNC signal.

The circuit block 7 comprises a synchronizer 71, which may be implemented with a Delay Locked Loop, DLL, and a timer 72 adapted to receive the output signal from the receiver 3. The High/Low signal is the output signal from the transmitter 1 and the output signal from the receiver 3.

In an embodiment, the transmission and reception apparatus for a digital signal through a galvanically isolated interface operates as follows.

In a first step of locking, the SYNC signal, i.e., the synchronization signal which is derived from the CLOCK signal by means of the sync generator 63, is transmitted from transmitter 1 to receiver 3, so that the synchronizer 71 is locked, i.e., synchronized with the transmission circuit.

During the second step, the DATA signal is transmitted and the receiver synchronization is kept by means of the synchronizer 71. At the beginning of transmission, during the step of locking, the END_LOCK signal is at the low logical level and through the circuit 61 the SYNC signal, which depends on the CLOCK signal, drives the transmitter 1 of the two-level isolated digital channel. In die 4, the SYNC signal received from receiver 3 is demodulated and supplied to the synchronizer 71 so that said circuit is locked. After a few clock cycles have elapsed, i.e., after a delay Tsync, which may depend on both the maximum latency of the transmission circuit and the synchronizer, has elapsed, the synchronizer 71 is locked to the phase of the SYNC signal. Thus, the step of sending the data by sending the DATA signal is started. The count of the clock cycles needed for locking is carried out by the timers 62 and 72. The delay Tsync may be chosen according to the maximum latency required for transmitting a bit frame, i.e., according to the combination of synchronization and data transmission, tolerated by the application in which interface 5 is inserted; once such a latency is known, the synchronizer 71 is designed so as to have an adequate locking time.

Passing from the step of locking to that of data sending is by means of the output END_LOCK signal of the timers 62 and 72, which reaches the high logical level. In die 2, such a signal allows to switch the circuit 61 on the DATA signal for driving the transmitter 1. In die 4, the END_LOCK signal communicates to the downstream circuits that DATA signal reception will start when the logical level is reached. Timer 72 simultaneously sends the HOLD signal to the high logical level to make the synchronizer work in hold mode, i.e., the feedback loop is opened so as to be indifferent to the input signal, which is now the DATA signal and no longer the SYNC signal from die 2, but still keeps the output CLOCK synchronization signal to which it had locked during the preceding step.

Figure 8:
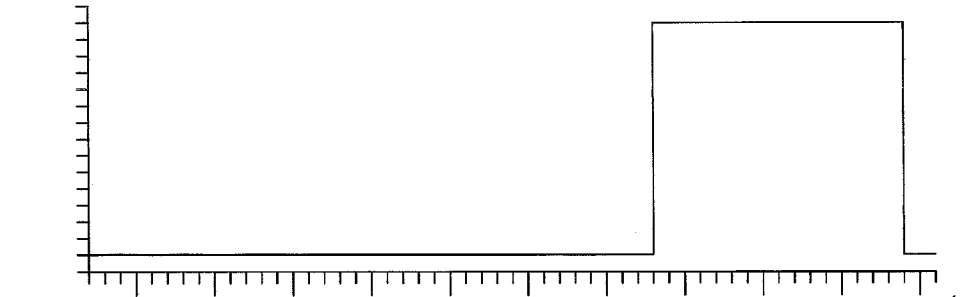
FIG. 8 shows example time diagrams of the signals of the transmitter die in the apparatus in FIG. 7.
Figure 8:
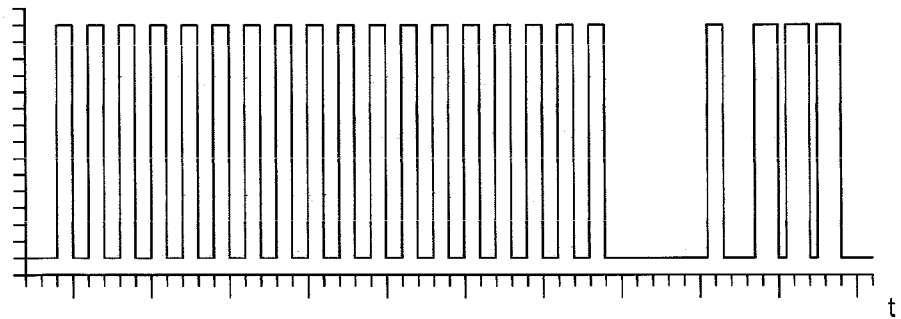

FIG. 8 shows example time diagrams of the waveforms of the signals related to die 2. The High/Low signal during the step of locking is equal to the SYNC signal. As illustrated, such a signal has a frequency which is half that of the CLOCK signal. During the step of sending the data, instead, when the END_LOCK signal is at the high logical level, the High/Low signal is equal to the DATA signal of the transmitter.

Figure 9:
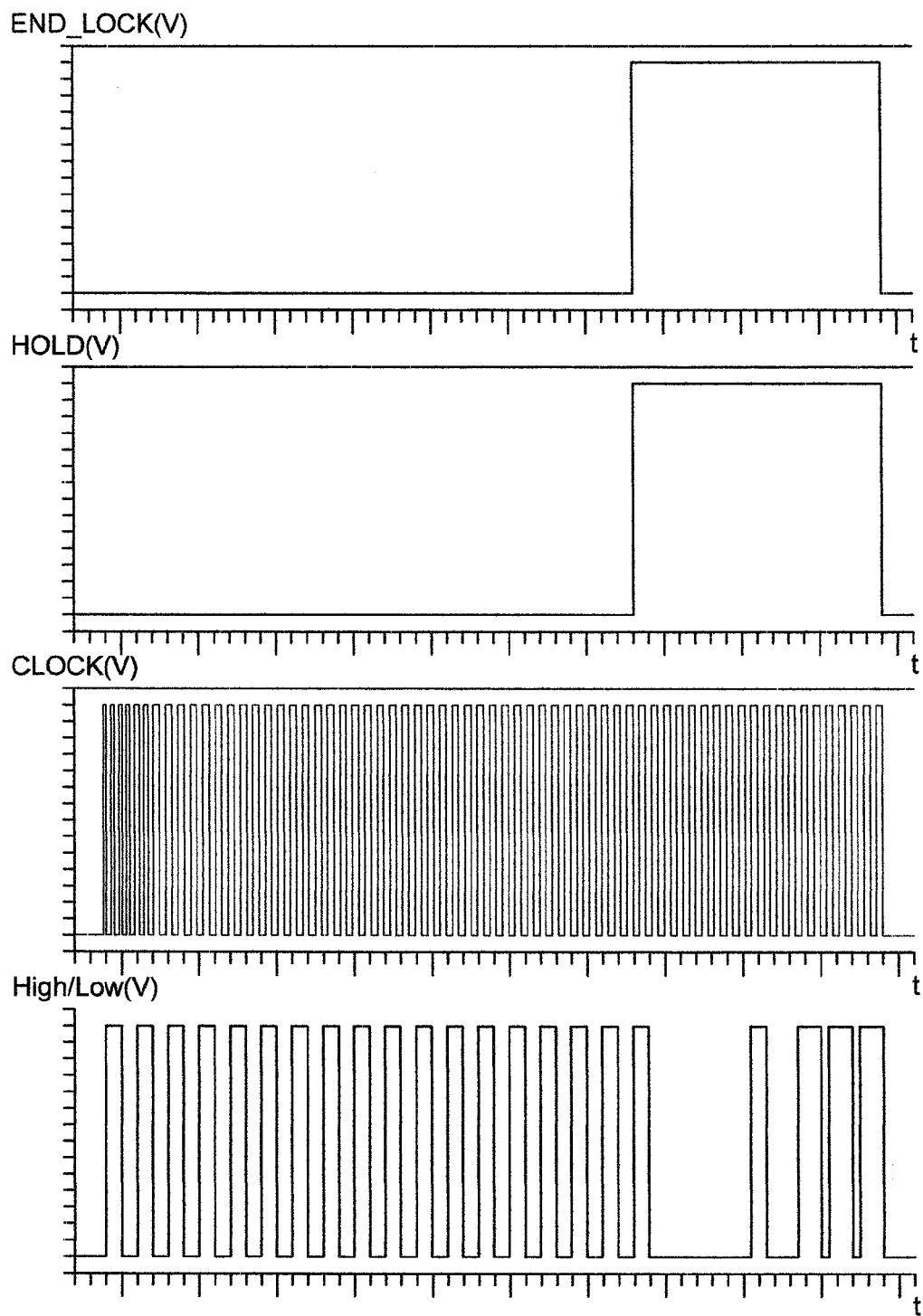
FIG. 9 shows example time diagrams of the signals of the receiver die in the apparatus in FIG. 7.

FIG. 9 shows example time diagrams of the waveforms of the signals related to die 4. The High/Low signal in the step of locking is equal to the SYNC signal of the transmitter; the synchronizer 71 is locked to the phase of this signal and synthesizes a frequency equal to double thereof. After the time interval needed for the synchronizer to be locked, the END_LOCK and HOLD signals reach the high logical level and the method goes to the next step of transmitting the data. During this step, the High/Low signal (or DATA signal) of the receiver 3 is equal to the DATA signal of die 2, while the synchronization is kept by the synchronizer 71 and is represented by the CLOCK signal. In this case, the information existing in the DATA signal may be derived by sampling the High/Low signal at each negative wave-front of the CLOCK signal.

Figure 10:
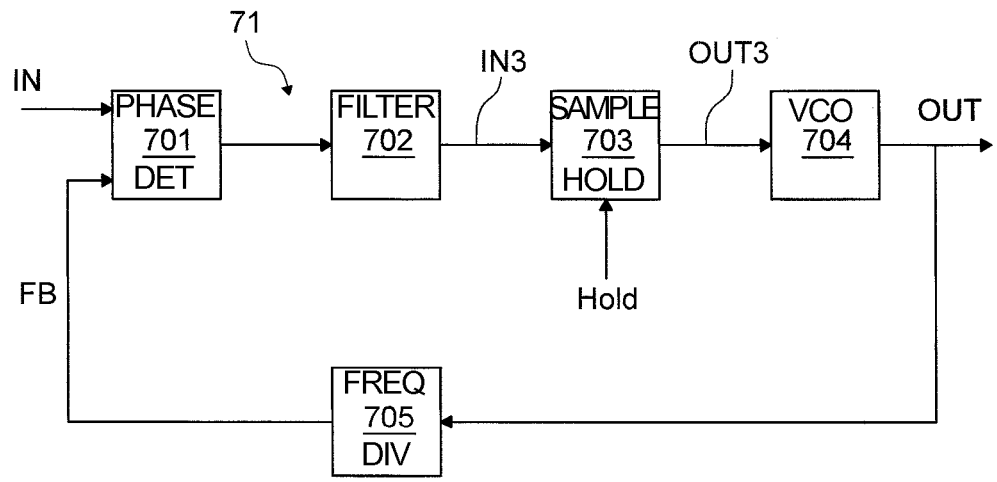
FIG. 10 shows an embodiment of the synchronizer of the apparatus in FIG. 7.

FIG. 10 shows the block diagram of an embodiment of the synchronizer 71. The latter comprises a phase-frequency detector (PFD) 701, which may be either analog or digital and supplies a signal proportional to the difference between the input frequency and the frequency indicated by the feedback signal FB; the PFD 701 has an input terminal IN on which the received High/Low signal is received and has the feedback signal FB at an input. The synchronizer 71 comprises a loop filter 702, which attenuates the higher order harmonics produced by the PFD 701 and stabilizes the loop. The synchronizer 71 comprises a voltage-controlled oscillator (VCO) 704 which outputs a signal, the oscillation of which is frequency-controlled by the input voltage from the PFD 701 through the loop filter 702. The synchronizer 71 comprises a frequency divider 705, which supplies a signal FB, the frequency of which is divided by a factor N with respect to the frequency of the output signal from the VCO 704, and exists on the output terminal OUT of the PFD. The value of N may depend on what is being transmitted during the step of locking, thus on the SYNC signal. For example, in an embodiment, when the CLOCK signal is directly transmitted, then N may be equal to 1, and when a signal the frequency of which is equal to half the CLOCK signal is transmitted, then N may be equal to 2.

Figure 11:
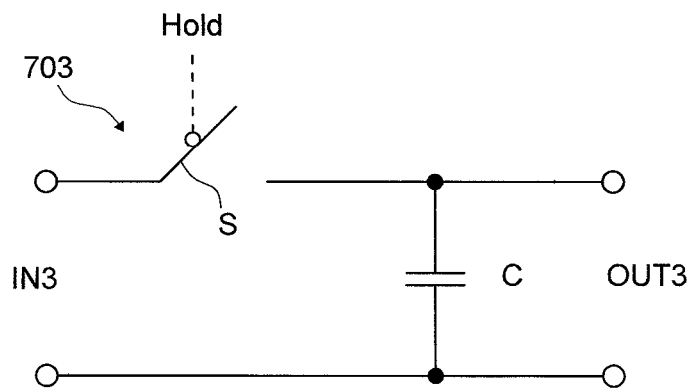
FIG. 11 shows an embodiment of a sample and hold diagram used in the DLL in FIG. 10.

The synchronizer 71 comprises a hold circuit 703 having the input terminal IN3 connected to the output of filter 702, and the output terminal OUT3 connected to the input terminal of VCO 704; the hold circuit 703 allows to interrupt the feedback loop, to sample the output voltage of the filter at the instant of time in which the hold mode is enabled and to hold such a value at the input of VCO 704 so that it is able to supply a signal synchronized with the CLOCK signal of die 2, by virtue of the preceding step of locking. The hold circuit 705 may be implemented by means of a Sample and Hold comprising a switch S and a capacitor C, as shown in FIG. 11. As illustrated in the embodiment of FIG. 11, when the Hold signal is at the low logical level, the switch is closed and the feedback loop is formed; thereby, the synchronizer 71 is locked to the phase of the input signal. When the Hold signal reaches the high logical level, the switch S opens and the feedback loop is interrupted. The capacitor keeps the output voltage value of the filter 702, which was present when the loop was interrupted. Thereby, if the locking transient is extinct, the VCO 704 supplies a signal which is phased with the CLOCK signal of die 2.

In an embodiment, the synchronizer may comprise, for example, one or more of a sample and hold block, an analog-to-digital converter, and a digital-to-analog converter in various combinations. For example, when Tseq is long, an analog voltage used to control a voltage controlled oscillator may be sampled when the receiver is synchronized, converted to a digital signal and stored. When the data signal is being received, the stored signal may be converted into an analog voltage signal and used to control the voltage controlled oscillator to maintain synchronization of the receiver.

Figure 12:
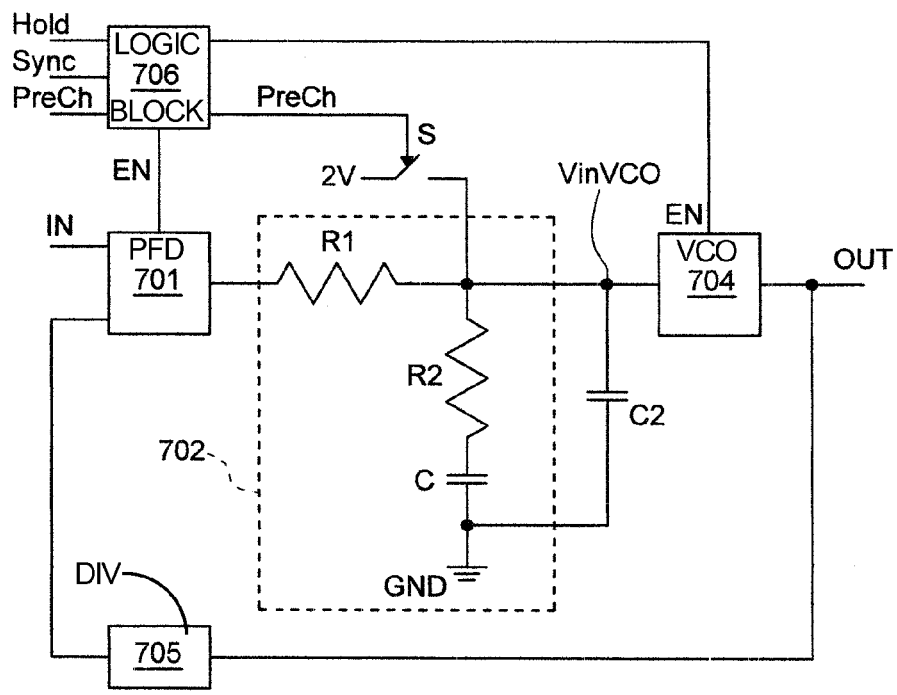
FIG. 12 is an embodiment of a circuit implementation of the synchronizer in FIG. 10.

FIG. 12 shows an embodiment of a circuit implementation of the synchronizer in FIG. 10. The synchronizer comprises PFD 701, VCO 704, divider 705 and loop filter 702 comprising a resistor R1 having one terminal connected to the output terminal of the PFD 701 and the other terminal connected to the input terminal of the VCO 704, and a series of a resistor R2 and a capacitor C connected to ground GND. The synchronizer 71 comprises a logical block 706 and a switch S used for pre-charging the loop filter 702; the Hold, Sync signals and a PreCh signal are inputted to the logical block 706, which signals are initially at low logical level. When the transmission is enabled, the PreCh signal is set to a high logical level for pre-charging the filter 702 by closing the switch S for a period Ts. For example, in an embodiment the filter 702 may be pre-charged to 2 volts by closing the switch S for about 500 nanoseconds. Once the step of pre-charging the filter has been ended, the switch S is opened and the Sync signal is led to the high logical level for the synchronizer to lock to the phase or frequency of the signal at input IN and synthesize a frequency equal to the double thereof. After the time interval needed for the synchronizer to lock, the Hold signal is led to the high logical level and the method goes to the next step of transmitting the data. The Hold signal at the high logical level keeps the PFD 701 in a tri-state, i.e., locked to the frequency of the Sync signal also during the step of transmitting the data; the logical block 706 sends an EN signal, which is the reverse of the Hold signal, to the PFD 701 to keep it in the tri-state.

Figure 13:
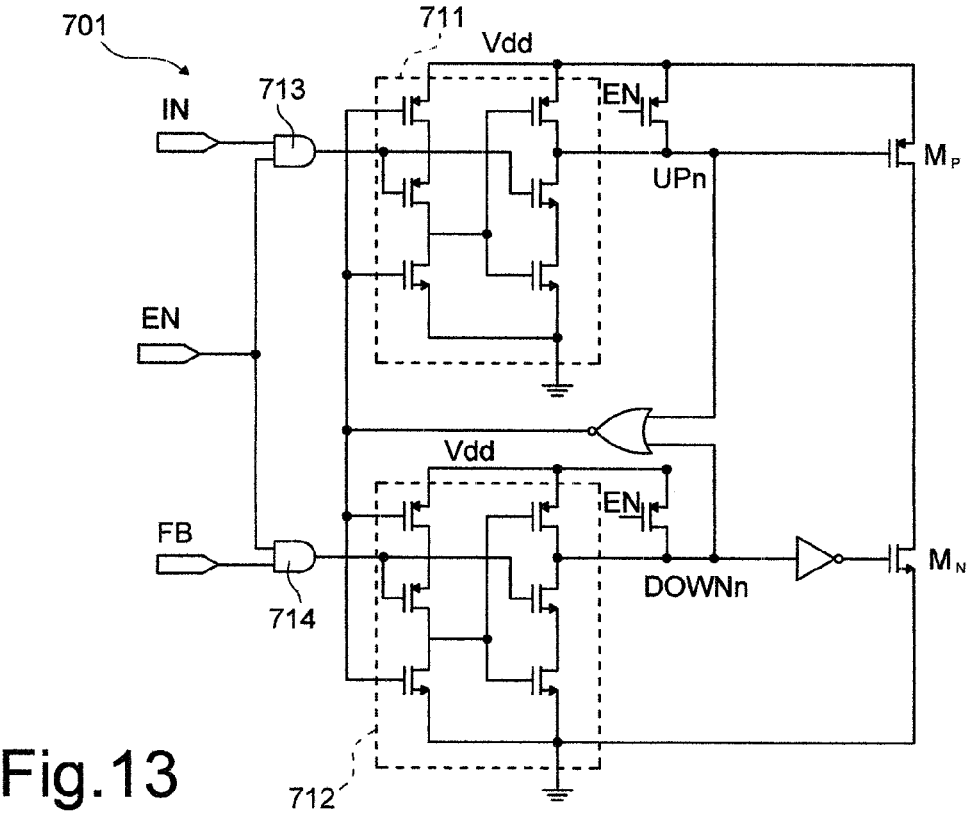
FIG. 13 is a diagram of an embodiment of the PFD used in the synchronizer in FIG. 12.

As shown in greater detail in an embodiment of FIG. 13, PFD 701 comprises two flip-flops of D or FF-D type 711 and 712 having outputs UPn and DOWNn. The signal on the IN terminal and the EN signal are inputted to an AND gate 713, the output of which is the input to the flip-flop 711, while the FB signal and the EN signal are inputted to an AND gate 714, the output of which is the input to the flip-flop 712. Assuming the two UPn and DOWNn outputs initially at high logical level, a signal up-edge on the IN terminal, with the EN signal at the high logical level, implies that the UPn signal reaches the low logical level; this indicates that the frequency of VCO 704 must be increased to be equal to the frequency of the signal at the input terminal. On the other hand, an up-edge of the FB signal, with the EN signal at the high logical level, implies that the DOWNn signal reaches the low logical level; this indicates that the frequency of VCO 704 must be decreased to be equal to the frequency of the signal at the input terminal. When the UPn and DOWNn outputs are at the low logical level, a NOR gate sends a reset signal to the D-type flip-flops 711 and 712 to take the PFD back to the initial state.

The PFD 701 comprises two transistors Mp and Mn having the drain terminal in common and with the source terminal of the transistor Mp connected to the supply voltage Vdd, and the source terminal of the transistor Mn connected to ground GND. The Mp transistor is driven by the UPn signal, while the Mn transistor is driven by the reverse of the DOWNn signal when the EN signal is at the high logical level.

When the EN signal is at the low logical level, i.e., the Hold signal is at the high logical level, the PMOS transistor Mp has the supply voltage Vdd on the gate terminal and is thus off, while the NMOS transistor Mn has the reverse of the supply voltage Vdd on the gate terminal and is thus off; thereby the PFD is kept in the tri-state, i.e., does not provide any output signals, and the control voltage of the VCO 704 is stored by the capacitance C of the loop filter 702 and thus the synchronization is kept. Since the PFD 701 is triggered by the up-edges of the input signals, in order to ensure the end of the charging transient of the loop filter, the Hold signal must reach the high logical level at the down-edges of the signal on the OUT terminal of the synchronizer. At the end of transmission, the Hold, Sync and PreCh signals are at the low logical level.

The capacitor C2 connected between the input terminal of the VCO 704 and the ground GND is used to introduce a high-frequency pole and to attenuate the harmonics generated by the PFD output.

Figure 14:
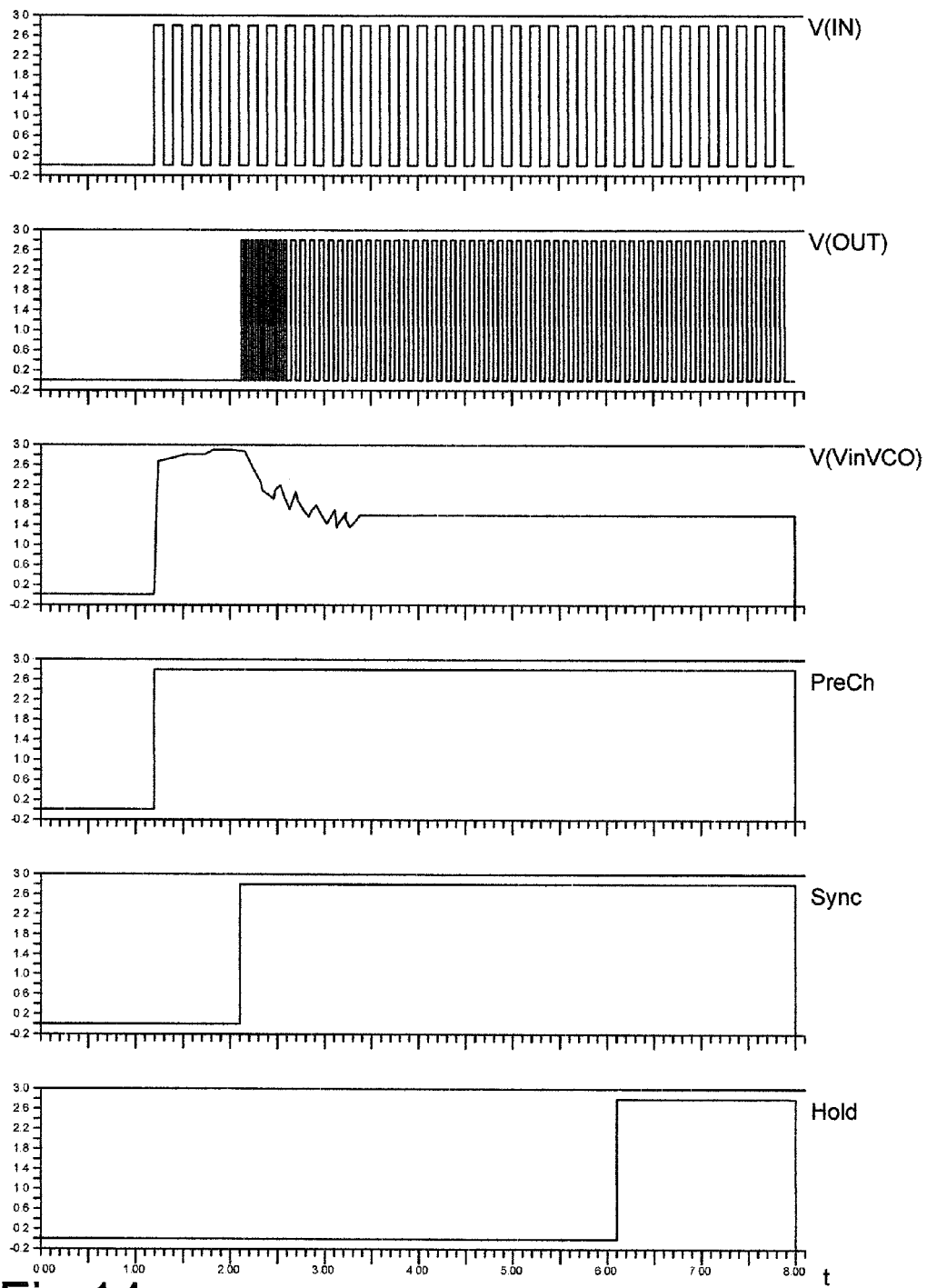
FIG. 14 shows example time diagrams of the involved signals in the synchronizer in FIG. 12.

Examples of the time diagrams of the involved signals in the synchronizer in FIG. 12 are shown in FIG. 14, where the frequency of the V(IN) signal on the input terminal IN is 7.5 Mhz and that of the V(OUT) signal on the OUT output terminal is of 15 Mhz and V(VinVCO) is the voltage on the input terminal of the VCO 704.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
a transmitter embedded in a package and configured to transmit digital signals having a first logic level and a second logic level higher than the first logic level;
a transmitter control block embedded in the package and coupled to the transmitter and configured to selectively provide synchronization signals or digital data signals to the transmitter for transmission;
a receiver embedded in the package and configured to receive signals transmitted by the transmitter;
a receiver control block embedded in the package and coupled to the receiver, the receiver control block configured to synchronize the receiver with the transmitter using synchronization signals received by the receiver from the transmitter, to memorize synchronization in a storage element and to hold synchronization while the transmitter is transmitting data signals; and
a galvanically isolated interface embedded in the package and coupled between the transmitter and the receiver, said transmitter and interface being configured to form a two-level isolated digital channel, wherein the transmitter control block is configured to provide a synchronization signal to the transmitter to transmit to the receiver during a determined synchronization period and to provide a digital data signal, the digital data signal being representative of a bit sequence of a determined length, to the transmitter to transmit during a determined data sequence transmission period after synchronization of the transmitter and receiver.

2. The apparatus according to claim 1 wherein said transmitter control block and said receiver control block each comprise a timer configured to determine a transition between the synchronization signal and the digital data signal.

3. The apparatus according to claim 1 wherein said transmitter control block comprises a selector configured to receive the synchronization signal and the digital data signal and to send the synchronization signal or digital data signal to said transmitter to transmit to the receiver.

4. The apparatus according to claim 1 wherein said receiver control block comprises a synchronizer comprising a phase-frequency detector, a voltage-controlled oscillator and a sampler, acting as storage element, coupled between the phase-frequency detector and the voltage-controlled oscillator, said phase-frequency detector generating a voltage proportional to a phase-frequency difference between the synchronization signal and a signal deriving from the voltage-controlled oscillator, said sampler configured to interrupt a feedback loop, to sample an output voltage of the phase-frequency detector and to keep the sampled output voltage of the phase-frequency detector at the input of the voltage-controlled oscillator so that the voltage-controlled oscillator provides a signal synchronous with the synchronization signal.

5. The apparatus according to claim 4 wherein said sampler comprises a sample and hold block comprising a switch and a capacitor having a terminal in common, said capacitor being coupled to the input of the voltage-controlled oscillator and to the output of the phase-frequency detector, the switch being controlled by a hold signal configured to keep the switch closed when synchronizing the receiver and the transmitter using the received synchronization signal and configured to open the switch after the synchronization, so that said capacitor keeps the output signal from the phase-frequency detector before opening the switch and said voltage-controlled oscillator, driven by the voltage at the terminals of said capacitor, supplies a signal which is in phase with the synchronization signal received when sending said digital data signal.

6. The apparatus according to claim 4 wherein the phase-frequency detector comprises first and second flip-flops having at an input signals output from respective first and second AND gates, the first AND gate having an input synchronization signal and an input reverse of a hold signal, the second AND gate having an input feedback signal and the input reverse of the hold signal, said flip-flops configured to increase or decrease a frequency of the voltage-controlled oscillator to make it equal to that of the input synchronization signal, said phase-frequency detector not supplying any output signal when said hold signal is at a high logical level.

7. The apparatus of claim 4 wherein the sampler comprises an analog-to-digital converter configured to convert a sampled analog signal to a digital control signal and a digital-to-analog converter configured to convert the digital control signal to an analog control signal.

8. The apparatus according to claim 1 wherein said galvanically isolated interface comprises a transmitting coupled inductor and a receiving coupled inductor comprising a pair of coils.

9. The apparatus according to claim 7 wherein said transmitter and said transmitting coupled inductor are integrated in a first die, and said receiver and said receiving coupled inductor are integrated in a second die, said first and second dice being encapsulated in the package.

10. The apparatus of claim 8 wherein the transmitter control block is integrated in the first die and the receiver control block is integrated in the second die.

11. A system, comprising:
a transmitter configured to:
  in a first mode of operation of the transmitter, transmit a synchronization signal during a determined synchronization time period; and
  in a second mode of operation of the transmitter, transmit, during a determined data transmission time period, a digital data signal having a first logic level and a second logic level higher than the first logic level, the digital data signal representative of a bit sequence of a determined length;
a receiver configured to:
  in a first mode of operation of the receiver, synchronize the receiver to the synchronization signal transmitted by the transmitter and memorize a synchronization control value; and
  in a second mode of operation of the receiver, receive the transmitted digital data signal using the memorized synchronization control value to maintain synchronization with the transmitter; and
a galvanically isolated interface positioned between the transmitter and the receiver, the transmitter and the galvanically isolated interface configured to form a two-layer isolated digital channel.

12. The system of claim 11 wherein the transmitter and the receiver each comprise a timer configured to determine an end of the first mode of operation and a beginning of the second mode of operation.

13. The system of claim 11 wherein the transmitter comprises a selector configured to receive the synchronization signal and the digital data signal and to select one of the synchronization signal and the digital data signal to transmit to the receiver.

14. The system of claim 11 wherein the receiver includes a synchronizer comprising:
a phase-frequency detector;
a voltage-controlled oscillator; and
a sample and hold module coupled between the phase-frequency detector and the voltage-controlled oscillator, said phase-frequency detector generating a voltage proportional to a phase-frequency difference between a received synchronization signal and a signal deriving from the voltage-controlled oscillator, said sample and hold module configured to interrupt a feedback loop, to sample an output voltage of the phase-frequency detector and to keep a sampled value of said output voltage of the phase-frequency detector at an input of the voltage-controlled oscillator so that the voltage controlled oscillator provides a signal synchronous with the received synchronization signal, wherein the sampled value of the output voltage of the phase-frequency detector is the memorized synchronization control value.

15. The system of claim 14 wherein the sample and hold module comprises a switch and a capacitor having a terminal in common, said capacitor being coupled to the input of the voltage-controlled oscillator and to the output of the phase-frequency detector, the switch being controlled by a hold signal adapted to keep the switch closed when synchronizing the receiver and the transmitter using the received synchronization signal and adapted to open the switch after synchronization, so that said capacitor keeps the output signal from the phase-frequency detector before opening the switch and said voltage-controlled oscillator, driven by the voltage at the terminals of said capacitor, supplies a signal which is in phase with the synchronization signal when receiving said digital data signal.

16. The system of claim 14 wherein the phase-frequency detector comprises first and second flip-flops having at an input a signal output from respective first and second AND gates, the first AND gate having an input clock signal and an input reverse of a hold signal, the second AND gate having an input feedback signal and the input reverse of the hold signal, said flip-flops configured to increase or decrease a frequency of the voltage-controlled oscillator to make it equal to that of the input synchronization signal, said phase-frequency detector not supplying any output signal when said hold signal is at a high logical level.

17. The system of claim 11 wherein the transmitter and a transmitting coupled inductor are integrated in a first die, and the receiver and a receiving coupled inductor are integrated in a second die, said first and second dice being encapsulated in a single package.

18. A device, comprising:
means for transmitting a synchronization signal in a first mode of operation of the means for transmitting, the first mode corresponding to a determined synchronization time period, and, in a second mode of operation of the means for transmitting, a digital data signal having a first logic level and a second logic level higher than the first logic level, the second mode of operation corresponding to a determined data transmission time period;

means for receiving signals transmitted by the means for transmitting, comprising:
- means for synchronizing to the synchronization signal in a first mode of operation of the means for receiving;
- means for memorizing a synchronization control value in the first mode of operation of the means for receiving; and
- means for processing a received digital data signal using the memorized synchronization control value in a second mode of operation of the means for receiving; and means for providing a two-layer isolated digital channel between the means for transmitting and the means for receiving.

19. The device of claim 18 wherein the means for transmitting and the means for receiving each comprise a timer configured to determine an end of the first mode of operation and a beginning of the second mode of operation.

20. The device of claim 18 wherein the means for transmitting comprises a selector configured to receive the synchronization signal and the digital data signal and to select one of the synchronization signal and the digital data signal to transmit to the receiver.

21. The device of claim 20 wherein the selector comprises a multiplexer.

22. The device of claim 18 wherein the means for receiving includes a synchronizer comprising:
- a phase-frequency detector;
- a voltage-controlled oscillator; and
- a sample and hold module coupled between the phase-frequency detector and the voltage-controlled oscillator, said phase-frequency detector generating a voltage proportional to a phase-frequency difference between a received synchronization signal and a signal deriving from the voltage-controlled oscillator, said sample and hold module configured to interrupt a feedback loop, to sample an output voltage of the phase-frequency detector and to keep a value of said sampled voltage of the phase-frequency detector at an input of the voltage-controlled oscillator so that the voltage controlled oscillator provides a signal synchronous with the received synchronization signal.

23. A method, comprising:
- transmitting, during a determined synchronization period, a synchronization signal from a transmitter to a receiver, wherein a galvanically isolated interface is positioned between the transmitter and the receiver, and the transmitter and the interface are configured to form a two-layer isolated digital channel;
- synchronizing the receiver to the synchronization signal;
- storing a synchronization control signal;
- transmitting, during a determined data transmission time period, a digital data signal having a first logic level and a second logic level higher than the first logic level from the transmitter to the receiver, the digital data signal representative of a sequence of bits of a determined length; and
- maintaining synchronization when receiving the transmitted digital data signal based on the stored synchronization control signal.

24. The method of claim 23, further comprising delaying a start of the data transmission time period for a determined delay time period after an end of the synchronization time period.

25. The method of claim 23 wherein storing the synchronization control signal comprises sampling and holding an output from a phase frequency detector when the receiver is synchronized with the synchronization signal.

26. The method of claim 23 wherein storing the synchronization control signal comprises sampling an output from a phase frequency detector when the receiver is synchronized with the synchronization signal, converting the sampled output to a digital control signal and storing the digital control signal.

* * * * *